(12) United States Patent
Guérin et al.

(10) Patent No.: US 11,941,789 B2
(45) Date of Patent: Mar. 26, 2024

(54) TONE MAPPING AND TONE CONTROL INTEGRATIONS FOR IMAGE PROCESSING

(71) Applicant: GoPro, Inc., San Mateo, CA (US)

(72) Inventors: Guillaume Matthieu Guérin, Chatillon (FR); Bruno César Douady, Orsay (FR)

(73) Assignee: GoPro, Inc., San Mateo, CA (US)

( * ) Notice: Subject to any disclaimer, the term of this patent is extended or adjusted under 35 U.S.C. 154(b) by 256 days.

(21) Appl. No.: 17/285,387

(22) PCT Filed: Jun. 13, 2019

(86) PCT No.: PCT/US2019/037002
§ 371 (c)(1),
(2) Date: Apr. 14, 2021

(87) PCT Pub. No.: WO2020/081126
PCT Pub. Date: Apr. 23, 2020

(65) Prior Publication Data
US 2021/0342987 A1    Nov. 4, 2021

Related U.S. Application Data

(60) Provisional application No. 62/747,793, filed on Oct. 19, 2018.

(51) Int. Cl.
*G06T 5/00*        (2006.01)
*H04N 23/10*       (2023.01)
*H04N 23/51*       (2023.01)

(52) U.S. Cl.
CPC .............. *G06T 5/009* (2013.01); *H04N 23/10* (2023.01); *H04N 23/51* (2023.01); *G06T 2207/10016* (2013.01); *G06T 2207/20021* (2013.01)

(58) Field of Classification Search
CPC ........... G06T 2207/20208; G06T 5/009; G06T 5/007; G06T 5/20; G06T 2207/20012;
(Continued)

(56) References Cited

U.S. PATENT DOCUMENTS 5,012,333 A  *  4/1991  Lee .......................... H04N 1/58
                                                        358/520
2008/0226190 A1    9/2008  Bae
(Continued)

FOREIGN PATENT DOCUMENTS

CN         102214353 A       10/2011
CN         102257531 A       11/2011
(Continued)

OTHER PUBLICATIONS

A. Artusi, A. O. Akyüz, B. Roch, D. Michael, Y. Chrysanthou and A. Chalmers, "Selective local tone mapping," 2013 IEEE International Conference on Image Processing, Melbourne, VIC, Australia, 2013, pp. 2309-2313, doi: 10.1109/ICIP.2013.6738476.*
(Continued)

*Primary Examiner* — Li Liu
(74) *Attorney, Agent, or Firm* — Young Basile Hanlon & MacFarlane, P.C.

(57) ABSTRACT

An image is processed using a combination of techniques, particularly, in which low frequency information is processed using multiple tone control and high frequency information is processed using local tone mapping. An image is divided into a plurality of blocks including a given block. Low frequency information and high frequency information of the given block are separated. The low frequency information is processed using multiple tone control. The high frequency information is processed using local tone mapping. A processed image is then produced based on the processed low frequency information and based on the
(Continued)

processed high frequency information, the processed image corresponding to the image captured using the image sensor. The processed image is then output for storage or display. Processing the low frequency information can include using a gain curve and bilinear interpolation. Processing the high frequency information can include using an edge preservation filter.

20 Claims, 7 Drawing Sheets

(58) Field of Classification Search
CPC . G06T 2207/20028; G06T 2207/20021; G06T 2207/20004; G06T 2207/20192; G06T 2207/20024
See application file for complete search history.

(56) References Cited

U.S. PATENT DOCUMENTS

| | | | |
|---|---|---|---|
| 2010/0157078 A1 | 6/2010 | Atanassov | |
| 2013/0076763 A1* | 3/2013 | Messmer | H04N 9/67 345/506 |
| 2016/0027160 A1* | 1/2016 | Aydin | G06T 5/50 382/162 |
| 2016/0042491 A1 | 2/2016 | Croxford | |
| 2016/0328830 A1* | 11/2016 | Pouli | H04N 21/4318 |
| 2016/0343117 A1* | 11/2016 | Schultz | G06T 11/60 |
| 2017/0061590 A1* | 3/2017 | Chamaret | G06T 5/009 |
| 2017/0070719 A1* | 3/2017 | Smolic | H04N 25/57 |
| 2017/0256039 A1 | 9/2017 | Chia-Jung | |
| 2019/0068865 A1* | 2/2019 | Guerin | G06T 5/008 |

FOREIGN PATENT DOCUMENTS

| | | |
|---|---|---|
| CN | 103067661 A | 4/2013 |
| CN | 104408752 A | 3/2015 |
| CN | 105825472 A | 8/2016 |
| CN | 107040775 A | 8/2017 |
| CN | 108090886 A | 5/2018 |
| CN | 108122211 A | 6/2018 |
| WO | 2015097118 A1 | 7/2015 |
| WO | 2017035661 A1 | 3/2017 |
| WO | 2017152398 A1 | 9/2017 |

OTHER PUBLICATIONS

Eilertsen, Gabriel, Rafal Konrad Mantiuk, and Jonas Unger. "A comparative review of tone-mapping algorithms for high dynamic range video." Computer graphics forum. vol. 36. No. 2. 2017.*
International Search Report and Written Opinion for Application No. PCT/US2019/037002, dated Sep. 5, 2019, 10 pages.
International Preliminary Report on Patentability for App. No. PCT/US2019/037002, dated Apr. 29, 2021, 7 pages.
Kuo, Pin-Hung, et al. "Automatic high dynamic range hallucination in inverse tone mapping." 2014 IEEE 16th International Workshop on Multimedia Signal Processing (MMSP). IEEE, 2014.

* cited by examiner

TONE MAPPING AND TONE CONTROL INTEGRATIONS FOR IMAGE PROCESSING

CROSS-REFERENCE TO RELATED APPLICATIONS

This application is a 371 of International Application No. PCT/US2019/037002 filed on Jun. 13, 2019, which claims the priority to U.S. Provisional Application No. 62/747,793, filed on Oct. 19, 2018, the entire disclosures of which are hereby incorporated by reference.

TECHNICAL FIELD

This disclosure relates to tone mapping and tone control integrations for image processing.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be processed and then stored or output. Combinations of red, green, and blue color components are used to create colors for pixels of the image. The amounts of each of those color components used to create the colors for the pixels represent the intensity levels of the respective colors for those pixels.

SUMMARY

This disclosure describes, inter alia, systems and techniques for tone mapping and tone control integrations for image processing.

One aspect of this disclosure is an image capture apparatus. The image capture apparatus comprises an image sensor, a processor, and a memory. The memory includes instructions which are executable by the processor. The instructions include instructions to capture an image using the image sensor, divide the image into a plurality of blocks including a given block, separate low frequency information of the given block and high frequency information of the given block, process the low frequency information of the given block using multiple tone control, process the high frequency information of the given block using local tone mapping, produce a processed image based on the processed low frequency information and based on the processed high frequency information in which the processed image corresponds to the image captured using the image sensor, and output the processed image for storage or display.

In some implementations of the image capture apparatus, the instructions to process the low frequency information of the given block using multiple tone control include instructions to perform multiple tone control against the low frequency information of the given block based on a gain curve computed for the given block and based on results of a bilinear interpolation performed between the given block and one or more blocks adjacent to the given block within the image.

In some implementations of the image capture apparatus, the gain curve is a global tone mapping curve.

In some implementations of the image capture apparatus, a contrast of the low frequency information within one or more pixels of the given block is enhanced by performing the multiple tone control against the low frequency information of the given block.

In some implementations of the image capture apparatus, the instructions to process the low frequency information of the given block using local tone mapping include instructions to perform local tone mapping against the high frequency information of the given block using an edge preservation filter.

In some implementations of the image capture apparatus, a size of the edge preservation filter is smaller than a size of a filter used to perform the local tone mapping without also performing the multiple tone control.

In some implementations of the image capture apparatus, a resolution of the multiple tone control is increased based on a size of the edge preservation filter, wherein increasing the resolution of the multiple tone control compensates for an effect on medium frequency information of the image by the local tone mapping.

In some implementations of the image capture apparatus, a contrast of the high frequency information within one or more pixels of the given block is preserved or enhanced by performing the local tone mapping against the high frequency information of the given block.

In some implementations of the image capture apparatus, the instructions to process the low frequency information of the given block using local tone mapping include instructions to process a pixel of the given block based on a low pass version of a luminance value of the pixel averaged with one or more neighbors of the pixel to produce a processed pixel.

In some implementations of the image capture apparatus, the processed image is produced using multi-level lookup tables, wherein a first lookup table of the multi-level lookup tables stores parameter values used to process the low frequency information, wherein one of a plurality of second lookup tables of the multi-level lookup tables stores parameter values used to process the high frequency information.

Another aspect of this disclosure is an image processor. The image processor comprises an image capture unit and an image processing unit. The image capture unit is configured to capture an image. The image processing unit is configured to divide the image into blocks and perform image processing against each of the blocks. For a given block of the blocks, the image processing unit performs the image processing by: separating low frequency information of the given block and high frequency information of the given block; performing multiple tone control against the low frequency information of the given block based on a gain curve computed for the given block and based on results of a bilinear interpolation performed between the given block and one or more blocks adjacent to the given block within the image; performing local tone mapping against the high frequency information of the given block using an edge preservation filter; and producing a processed block based on results of the multiple tone control and results of the local tone mapping. A processed image is produced based on the processed block and based on other processed blocks produced by the image processing unit.

In some implementations of the image processor, the gain curve is a global tone mapping curve.

In some implementations of the image processor, a size of the edge preservation filter is smaller than a size of a filter used to perform the local tone mapping without also performing the multiple tone control.

In some implementations of the image processor, performing the multiple tone control against the low frequency information of the given block includes enhancing a contrast of the low frequency information within one or more pixels of the given block.

In some implementations of the image processor, performing the local tone mapping against the high frequency information of the given block includes preserving or enhancing a contrast of the high frequency information within one or more pixels of the given block.

In some implementations of the image processor, the processed blocks are produced using multi-level lookup tables, wherein a first lookup table of the multi-level lookup tables stores parameter values associated with low frequency information of the image, wherein a plurality of second lookup tables of the multi-level lookup tables each stores parameter values associated with high frequency information of one of the blocks.

In some implementations of the image processor, a resolution of the multiple tone control is increased based on a size of the edge preservation filter, wherein increasing the resolution of the multiple tone control compensates for an effect on medium frequency information of the image by the local tone mapping.

Another aspect of this disclosure is a method. The method comprises filtering a block of an image to separate low frequency information of the block and high frequency information of the block, processing the low frequency information using multiple tone control and based on a global tone mapping curve, processing the high frequency information using local tone mapping, and producing a processed image using the processed low frequency information and the processed high frequency information.

In some implementations of the method, processing the low frequency information using the multiple tone control and based on the global tone mapping curve comprises enhancing a contrast of the low frequency information within one or more pixels of the block, and processing the high frequency information using local tone mapping comprises preserving or enhancing a contrast of the high frequency information within the one or more pixels of the block.

In some implementations of the method, a size of edge preservation filter used to perform the local tone mapping is smaller than a size of a filter used to perform the local tone mapping without also performing the multiple tone control.

These and other aspects of this disclosure are disclosed in the following detailed description, the appended claims, and the accompanying figures.

BRIEF DESCRIPTION OF THE DRAWINGS

The disclosed implementations have other advantages and features that will be more readily apparent from the detailed description, the appended claims, and the accompanying figures. A brief introduction of the figures is below.

DETAILED DESCRIPTION

Figure 1A:
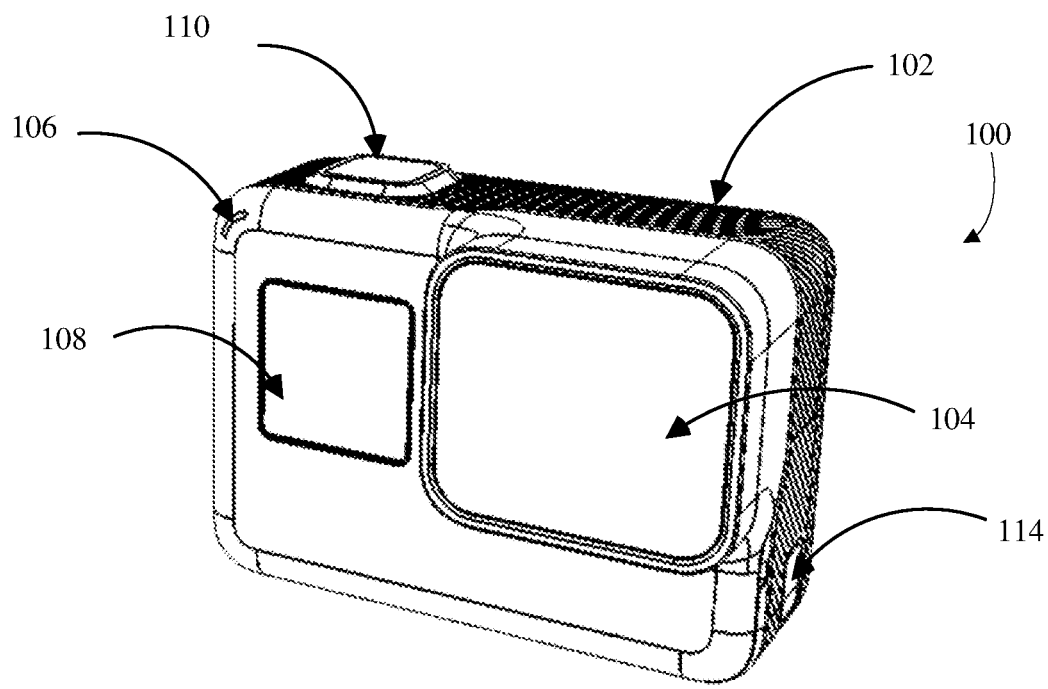
FIGS. 1A-D are isometric views of an example of an image capture device.
Figure 1B:
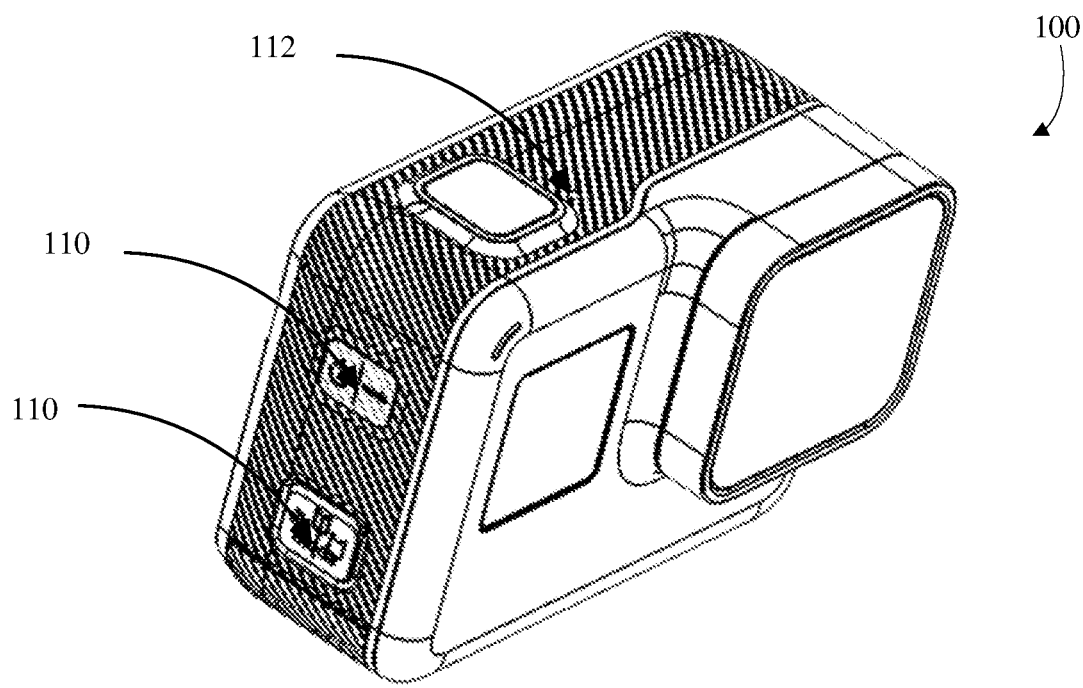
Figure 1C:
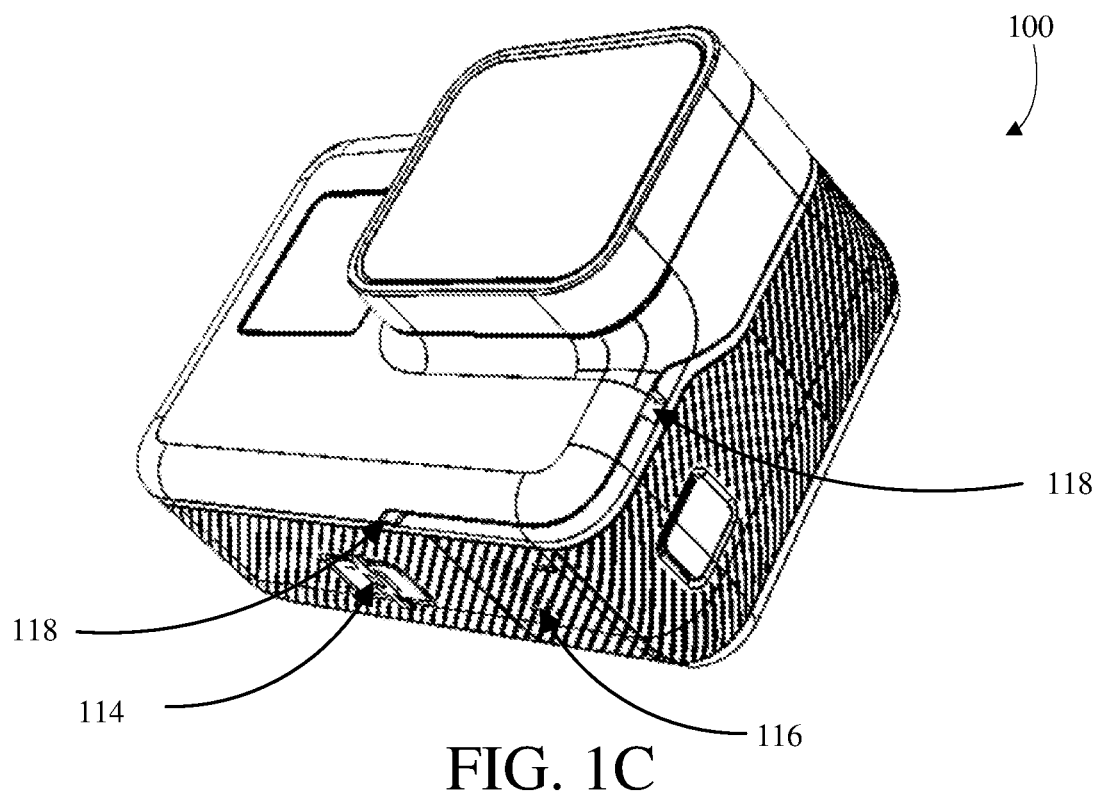
Figure 1D:
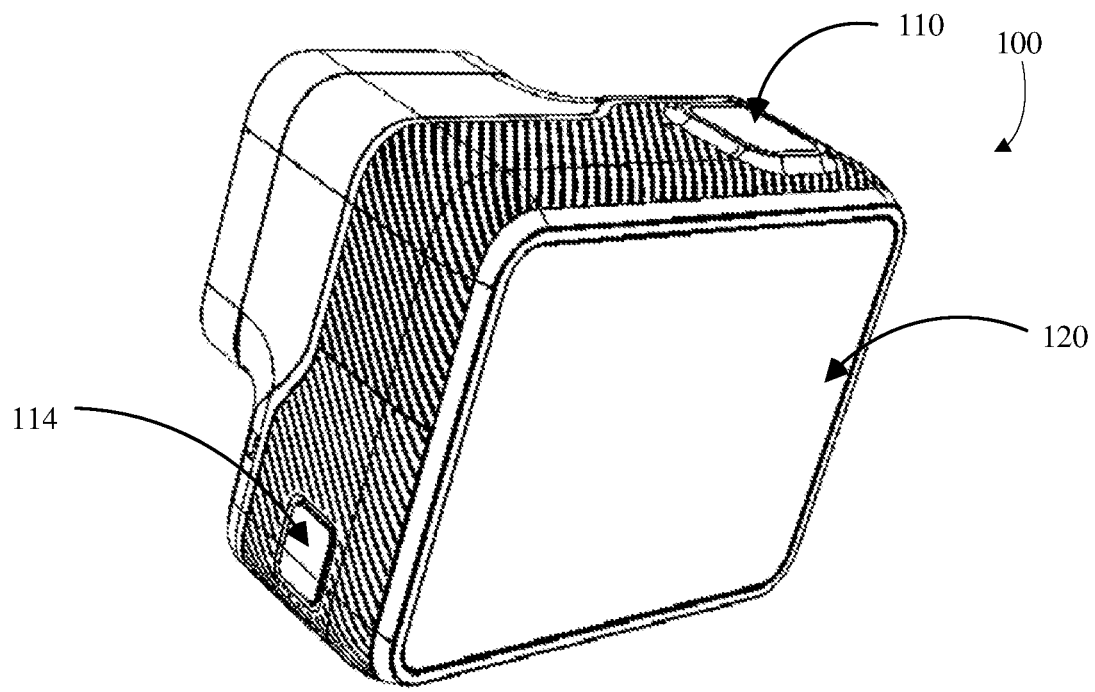

An image capture device captures an image by using image sensors to measure the intensity of light exposed to those image sensors. The measured light intensities are converted into a voltage measurement as an analog signal. The process for converting those measured light intensities into a voltage measurement results in noise being generated against the image. The amount of noise produced as a result of the conversion process may be reduced using one or more image processing techniques, such as to improve the quality of the image that is output for display. Examples of such image processing techniques include global tone mapping (GTM), local tone mapping (LTM), and multiple tone control (MTC).

GTM includes estimating and applying a gain curve to an entire image to enhance contrast. However, generally increasing the contrast of the image in this way may in some cases result in local details within the image being compressed. In contrast, LTM includes preserving and enhancing local details by applying a large (e.g., 150×150) filter against the image. Applying the filter against the image separates the low frequency information and high frequency information of the image. LTM then operates against the high frequency information. However, using such a large filter can be computationally expensive.

Separately, MTC causes a relatively inexpensive enhancement for local contrast within an image. MTC includes dividing the image into several (M×N, where M and N may be the same or different numbers) blocks. A GTM curve is then computed for each of the blocks. The various GTM curves are then blended using bilinear interpolation to prevent discontinuities between neighboring blocks from affecting the image processing. MTC allows for finer control of GTM and reduces the loss of details, such as by selecting a best GTM curve for the entire image. MTC is relatively inexpensive in that it uses only M×N histograms and M×N lookup tables (LUTs). However, MTC may result in a loss of detail in smaller areas of the image.

Implementations of this disclosure address problems such as these using tone mapping and tone control integrations for image processing, such to reduce the computational expense of the image processing without loss of local image details. Particularly, low frequency information from an image is processed using MTC and high frequency information from the image is processed using LTM. The image is divided into a number of blocks. A filter (e.g., 40×40 or otherwise smaller than a size of a filter used to perform LTM without also performing MTC) is applied to each block to separate the low frequency information within that block form the high frequency information within that block. The low frequency information is then processed using MTC and based on a GTM curve, while the high frequency information is processed using LTM. Processing the low frequency information using MTC helps to reduce the computational expense for the image processing, while processing the high frequency information using LTM helps to prevent or limit the loss of local details within the image blocks.

The implementations of this disclosure are described in detail with reference to the drawings, which are provided as examples so as to enable those skilled in the art to practice the technology. The figures and examples are not meant to limit the scope of this disclosure to a single implementation, and other implementations are possible by way of interchange of, or combination with, some or all of the described or illustrated elements. Wherever convenient, the same reference numbers will be used throughout the drawings to refer to same or like parts.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video, and to store captured images and video for subsequent display or playback.

The image capture device 100 can include various indicators, including the LED lights 106 and the LED display 108. The image capture device 100 can also include buttons 110 configured to allow a user of the image capture device 100 to interact with the image capture device 100, to turn the image capture device 100 on, and to otherwise configure the operating mode of the image capture device 100. The image capture device 100 can also include a microphone 112 configured to receive and record audio signals in conjunction with recording video. The side of the image capture device 100 may include an I/O interface 114.

The camera may also include a microphone 116 system integrated into the camera housing. The front surface of the camera may include two drainage ports as part of a drainage channel 118 for the camera audio system. The camera can include an interactive display 120 that allows for interaction with the camera while simultaneously displaying camera information on a surface of the camera. As illustrated, the image capture device 100 may include a lens 104 configured to receive light incident upon the lens and to direct received light onto an image sensor internal to the lens.

The image capture device 100, includes a camera exterior that encompasses and protects the camera's internal electronics, which are further described in later sections. The camera exterior includes six surfaces (i.e. a front face, a left face, a right face, a back face, a top face, and a bottom face), wherein the exterior surfaces form a rectangular cuboid. Furthermore, both the front and rear surfaces of the image capture device 100 are substantially rectangular in shape. The image capture device 100 can be made of a rigid material such as plastic, aluminum, steel, or fiberglass.

Additional camera features, such as the features described above, may be affixed to an exterior of the camera. In some implementations, the camera described herein includes features other than those described below. For example, instead of a single interface button, the camera can include additional buttons or different interface features, such as a multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, in some implementations, the image capture device 100 may include one or more microphones, which may receive, capture, and record audio information, which may be associated with images acquired by the image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture device 100 may interface with or communicate with an external device, such as an external user interface device, via a wired or wireless computing communication link (not shown). The user interface device may, for example, be the personal computing device 360 described below with respect to FIG. 3. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the image capture device 100 may transmit images, such as panoramic images, or portions thereof, to the user interface device (not shown) via the computing communication link, and the user interface device may store, process, display, or a combination thereof the panoramic images.

In some implementations, the user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

In some implementations, the user interface device may display, or otherwise present, content, such as images or video, acquired by the image capture device 100. For example, a display of the user interface device may be a viewport into the three-dimensional space represented by the panoramic images or video captured or created by the image capture device 100.

In some implementations, the user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

In some implementations, the user interface device may implement or execute one or more applications to manage or control the image capture device 100. For example, the user interface device may include an application for controlling camera configuration, video acquisition, video display, or any other configurable or controllable aspect of the image capture device 100.

In some implementations, the user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

In some implementations, the user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

In some implementations, the user interface device, such as via an application, may display, or otherwise present, marks or tags associated with images or video, such as in response to user input. For example, marks may be presented in a camera roll application for location review and/or playback of video highlights.

In some implementations, the user interface device, such as via an application, may wirelessly control camera software, hardware, or both. For example, the user interface device may include a web-based graphical interface accessible by a user for selecting a live or previously recorded video stream from the image capture device 100 for display on the user interface device.

In some implementations, the user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2:
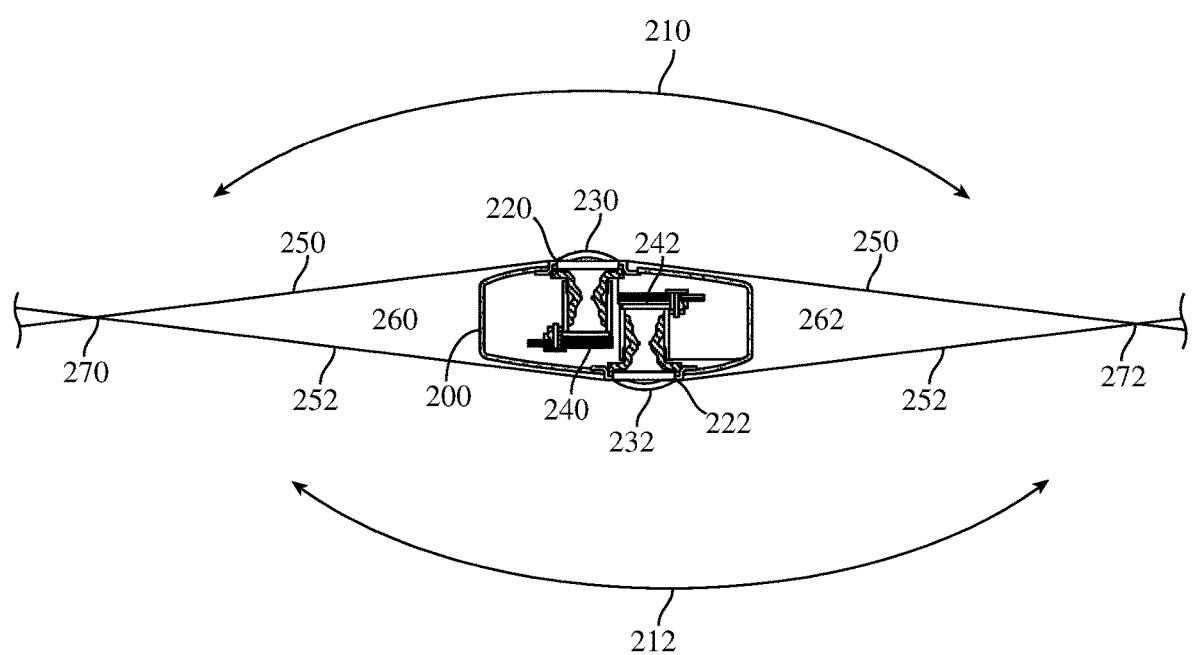
FIG. 2 is a cross-sectional view of an example of an image capture device including overlapping fields-of-view.

FIG. 2 is a cross-sectional view of an example of a dual-lens image capture device 200 including overlapping fields-of-view 210, 212. In some implementations, the image capture device 200 may be a spherical image capture device with fields-of-view 210, 212 as shown in FIG. 2. For example, the image capture device 200 may include image capture devices 220, 222, related components, or a combination thereof, arranged in a back-to-back or Janus configuration. For example, a first image capture device 220 may include a first lens 230 and a first image sensor 240, and a second image capture device 222 may include a second lens 232 and a second image sensor 242 arranged oppositely from the first lens 230 and the first image sensor 240.

The first lens 230 of the image capture device 200 may have the field-of-view 210 shown above a boundary 250.

Behind the first lens 230, the first image sensor 240 may capture a first hyper-hemispherical image plane from light entering the first lens 230, corresponding to the first field-of-view 210.

The second lens 232 of the image capture device 200 may have a field-of-view 212 as shown below a boundary 252. Behind the second lens 232, the second image sensor 242 may capture a second hyper-hemispherical image plane from light entering the second lens 232, corresponding to the second field-of-view 212.

One or more areas, such as blind spots 260, 262, may be outside of the fields-of-view 210, 212 of the lenses 230, 232, light may be obscured from the lenses 230, 232 and the corresponding image sensors 240, 242, and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap may be referred to herein as overlap points or stitch points. Content captured by the respective lenses 230, 232, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image.

A small change in the alignment, such as position and/or tilt, of the lenses 230, 232, the image sensors 240, 242, or both may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 230, 232 and the image sensors 240, 242 such that the fields-of-view 210, 212, stitch points 270, 272, or both may be accurately determined, which may improve the accuracy, efficiency, or both of generating a combined image.

Optical axes through the lenses 230, 232 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 230, 232, such that the image sensors may be perpendicular to the respective axes to within a tolerance such as 1%, 3%, 5%, 10%, and/or other tolerances.

The lenses 230, 232 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 230, 232 may include substantially reduced thickness relative to the lengths of the lens barrels securing the lenses 230, 232. For example, the overall thickness of the image capture device 200 may be close to the length of a single lens barrel as opposed to twice the length of a single lens barrel as in a back-to-back configuration. Reducing the lateral distance between the lenses 230, 232 may improve the overlap in the fields-of-view 210, 212.

Images or frames captured by an image capture device, such as the image capture device 100 shown in FIGS. 1A-D or the image capture device 200 shown in FIG. 2, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 3B:
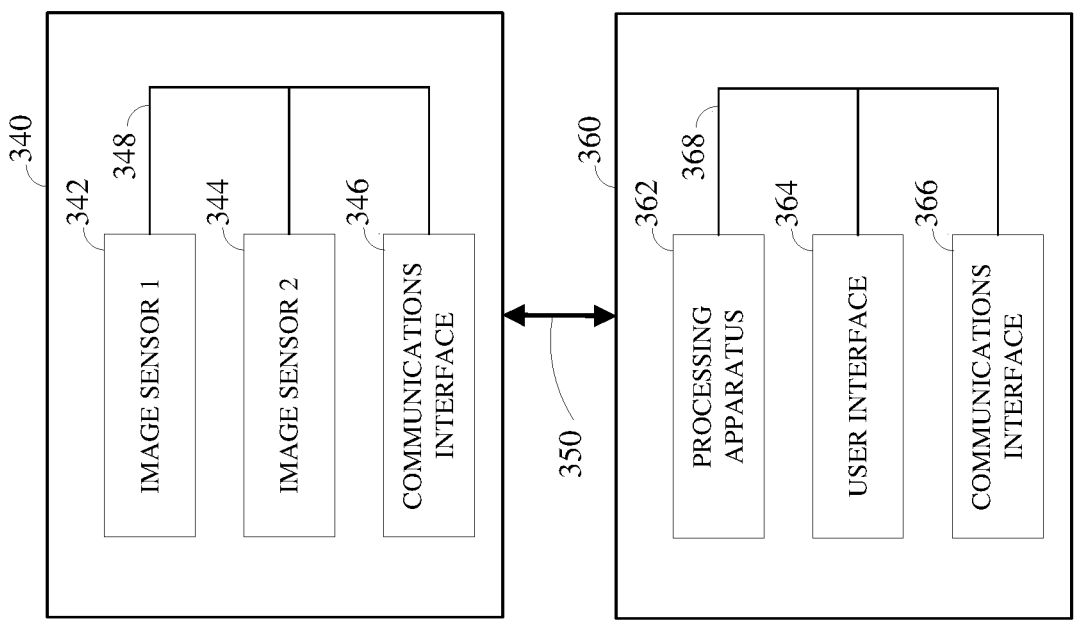
FIGS. 3A-B are block diagrams of examples of systems configured for image capture.
Figure 3A:
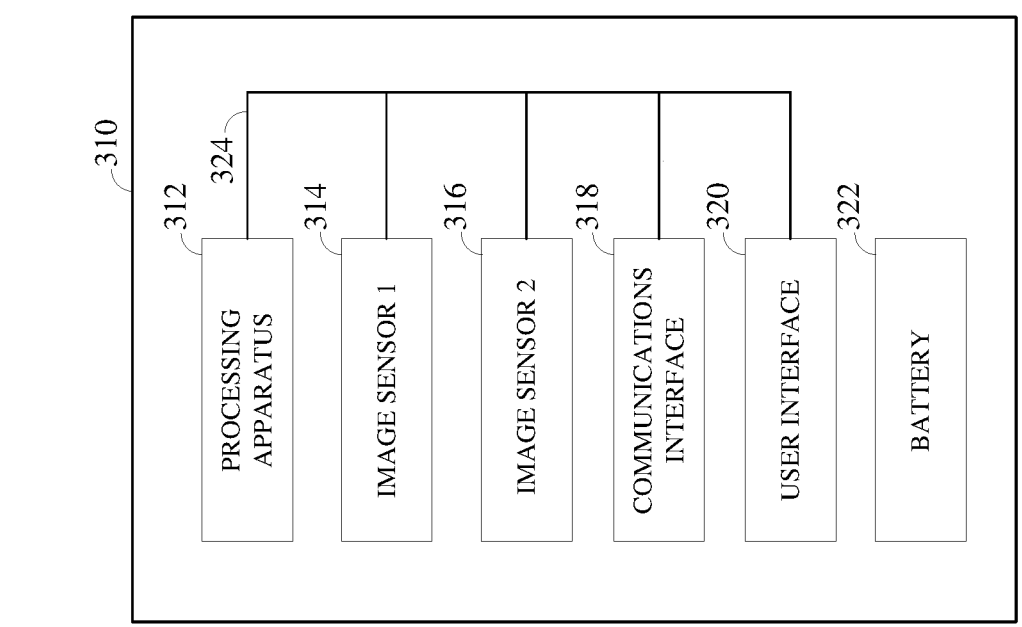

FIGS. 3A-B are block diagrams of examples of systems configured for image capture. Referring first to FIG. 3A, an image capture device 300 configured for image capture is shown. The image capture device 300 includes an image capture device 310 (e.g., a camera or a drone), which may, for example, be the image capture device 100 shown in FIGS. 1A-D. The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensors 314 and 316.

The image capture device 310 includes a communications interface 318 for transferring images to other devices. The image capture device 310 includes a user interface 320, which may allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 are configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The image capture device 310 may include a communications interface 318, which may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The image capture device 310 may include a user interface 320. For example, the user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures. The image capture device 310 may include a battery 322 that powers the image capture device 310 and/or its peripherals. For example, the battery 322 may be charged wirelessly or through a micro-USB interface.

In some implementations, the image capture device 310 may include one or more hardware or software components for performing tone mapping and tone control integrations for image processing against pixels of an image captured using the image capture device 310. For example, those one or more hardware or software components may be used to perform the technique 600 described below with respect to FIG. 6.

Referring next to FIG. 3B, a system 330 configured for image capture is shown. The system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D. The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor, and receive a second image from the second image sensor 344. The processing apparatus 362 may be configured to perform image signal processing (e.g., filtering, tone mapping, stitching, and/or encoding) to generate output images based on image data from the image sensors 342 and 344.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via the bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via the bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or snap photograph) received via the user interface 364 may be passed on to the image capture device 340 via the communications link 350.

In some implementations, the image capture device 340 and/or the personal computing device 360 may include one or more hardware or software components for performing tone mapping and tone control integrations for image processing against pixels of an image captured using the image capture device 340. For example, those one or more hardware or software components may be used to perform the technique 600 described below with respect to FIG. 6.

Figure 4:
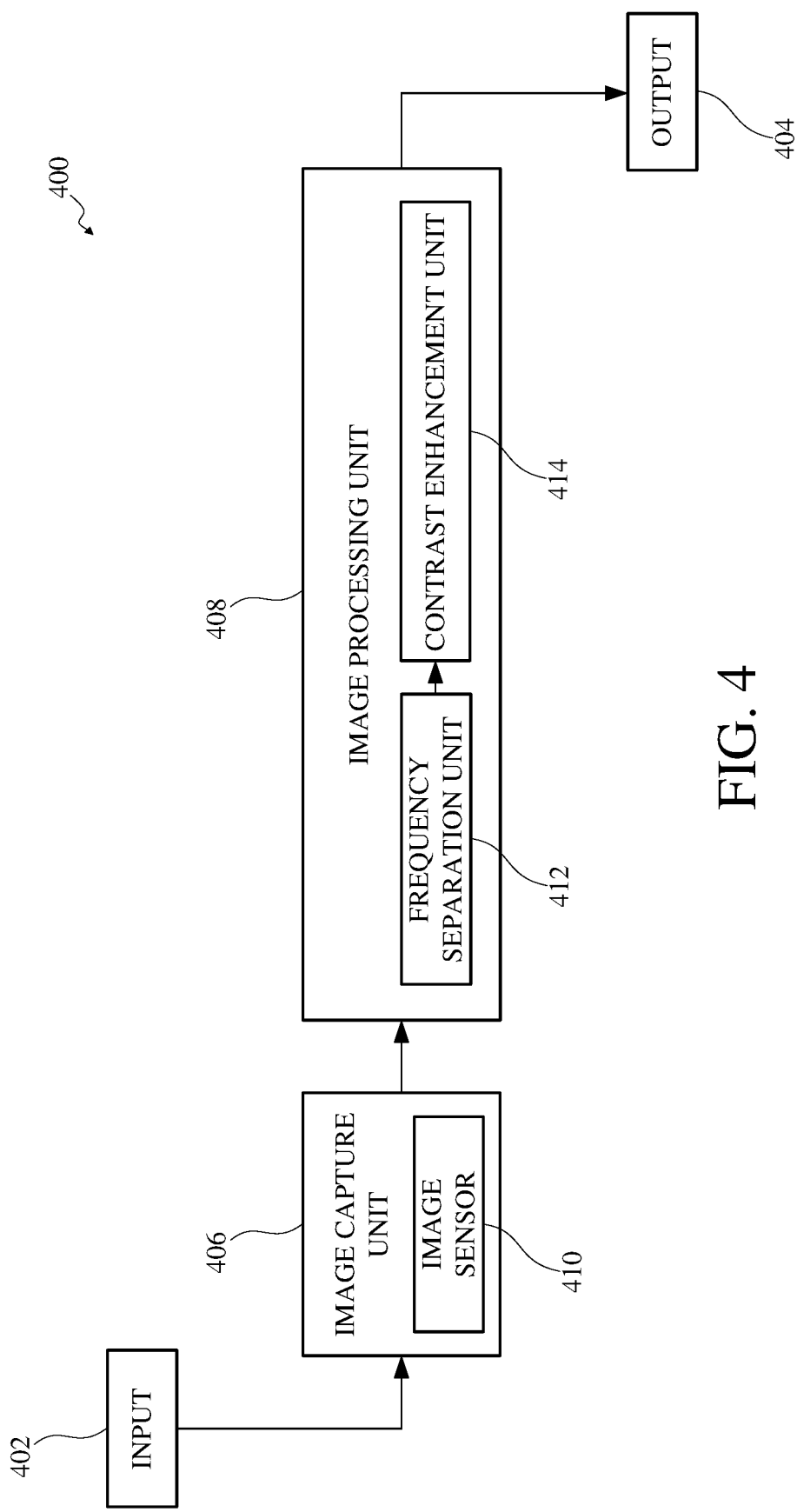
FIG. 4 is a block diagram of an example of an image processing and coding pipeline.

FIG. 4 is a block diagram of an example of an image processing and coding pipeline 400. The image processing and coding pipeline 400 may be included in an image capture device, such as the image capture device 100 shown in FIGS. 1A-D or the image capture device 200 shown in FIG. 2. Alternatively, or additionally, the image processing and coding pipeline 400 may represent functionality of an integrated circuit, for example, including an image capture unit, an image processing unit, or a combined image capture unit and image processing unit.

The image processing and coding pipeline 400 receives input 402 and processes the input 402 to produce output 404 using an image capture unit 406 and an image processing unit 408. The input 402 includes information or measurements usable to capture an image using the image capture unit 406. For example, the input 402 may include measurements and/or other information used by an image sensor 410 of the image capture unit 406 to capture an image. The output 404 is an image captured using the image capture unit 406 and processed using the image processing unit 408.

The image sensor 410 may, for example, be one or more of an image sensor of the image capture device 100, an image sensor of the image capture device 200 (e.g., the image sensor 240 or the image sensor 242), an image sensor of the image capture device 300 (e.g., the first image sensor 314 or the second image sensor 316), or an image sensor of the image capture device 330 (e.g., the first image sensor 342 or the second image sensor 344). In some implementations, the image capture unit 406 may include additional components beyond the image sensor 410. For example, the image capture unit 406 may refer to one or more components used to capture an image by the image capture device 100, the image capture device 200, the image capture device 300, or the image capture device 330.

The image processing unit 408 includes a frequency separation unit 412 and a contrast enhancement unit 414. The image processing unit 408 processes the image captured using the image capture unit 406 by separating frequency information within the image using the frequency separation unit 412 and then separately processing the different frequency information using contrast enhancement techniques using the contrast enhancement unit 414.

For example, the frequency separation unit 412 can separate the image captured using the image capture unit 406 into low frequency information and high frequency information. The contrast enhancement unit 414 may then use a first image processing technique, such as MTC, to process the low frequency information, and a second image processing technique, such as LTM, to process the high frequency information. In some implementations, the contrast enhancement unit 414 may also use MTC to process medium frequency information, for example, separated using the frequency separation unit 412. For example, performing MTC and LTM in combination can include increasing a resolution of the MTC based on a size of the edge preservation filter used by the LTM. Increasing the resolution of the MTC in this way compensates for an effect on medium frequency information of the image by the LTM.

Figure 5:
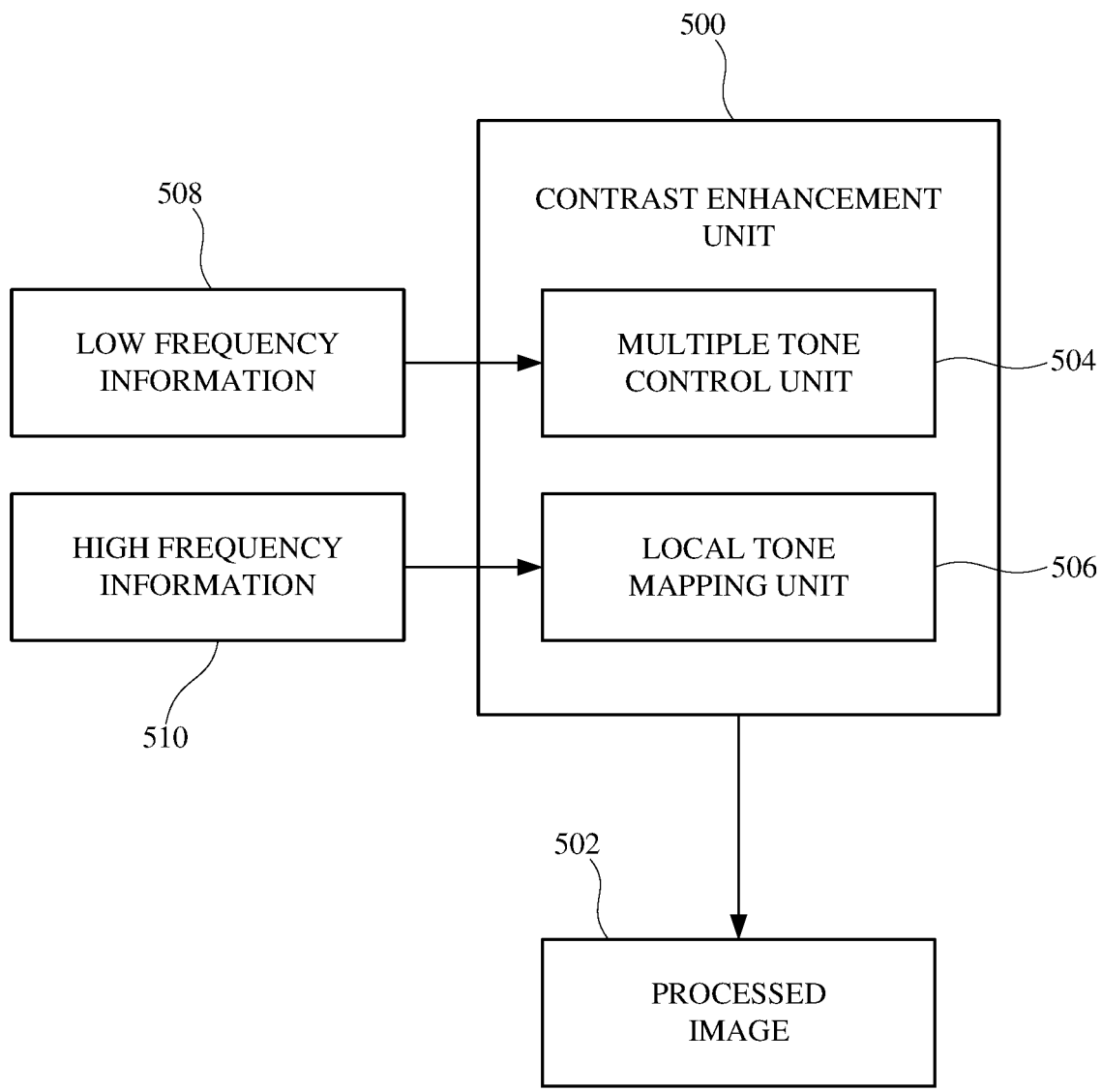
FIG. 5 is a block diagram of an example of a contrast enhancement unit used for image processing.

FIG. 5 is a block diagram of an example of a contrast enhancement unit 500 used for image processing. The contrast enhancement unit applies a combination of image processing techniques to an image to produce a processed image 502. The contrast enhancement unit 500 may, for example, be the contrast enhancement unit 414 shown in FIG. 4. The processed image 502 may, for example, be or refer to the output 404 shown in FIG. 4.

The contrast enhancement unit includes a MTC unit 504 and a LTM unit 506. The MTC unit 504 and the LTM unit 506 are used to process different information associated with an image. For example, the MTC unit 504 can be used to process low frequency information 508 associated with an image and the LTM unit 506 can be used to process high frequency information 510 associated with the image.

The low frequency information 508 (also referred to as a base layer) and the high frequency information 510 (also referred to as an enhancement layer) may be separated by applying a filter against the image (e.g., using the frequency separation unit 412 shown in FIG. 4). For example, applying the filter may cause frequency information other than the low frequency information to be removed from a given block of the image. The high frequency information may thus be determined based on a difference between the original image and the low frequency information.

A pixel of the image may be defined as $p=[R, G, B]^T$. The pixel p has a luminance value $x=Y(p)$, which corresponds to a weighted sum of the three color channels, R, G, and B. Other approaches to LTM may include producing a processed pixel $p'=g_{LTM}(\bar{x})*(\bar{x}+\alpha(x-\bar{x}))$, where $\bar{x}$ is a low pass version of x averaged with its most similar neighbors, and where $\alpha \geq 1$. However, the contrast enhancement unit 500 combines LTM with MTC for the image processing. Thus, processing the using LTM and MTC includes producing a processed pixel $p'=g_{MTC}(\bar{x})*(\bar{x}+\alpha(x-\bar{x}))$, where $\bar{x}$ is a low pass version of x averaged with its most similar neighbors, and where $\alpha \geq 1$.

The principle of the image processing performed using the contrast enhancement unit 500 indicates that LTM and MTC are not exclusive and that a smooth version of x can be used to combine them using the above formulae. Since MTC resolution is generally low, the goal with MTC is to enhance contrast on the low frequency details within the image. As a result, the MTC performed using the contrast enhancement unit 500 may have a higher resolution than other MTC approaches. Along the same lines, the LTM performed using the contrast enhancement unit 500 may use a smaller filter size (e.g., 40×40) than what is used in other LTM approaches (e.g., 150×150), such as LTM approaches that are not performed along with MTC.

In some implementations, the processed blocks are produced using multi-level LUTs. For example, a first LUT of the multi-level LUTs can store parameter values associated with low frequency information of the image, whereas each of plurality of second lookup tables of the multi-level lookup tables can store parameter values associated with high frequency information of one of the blocks.

Figure 6:
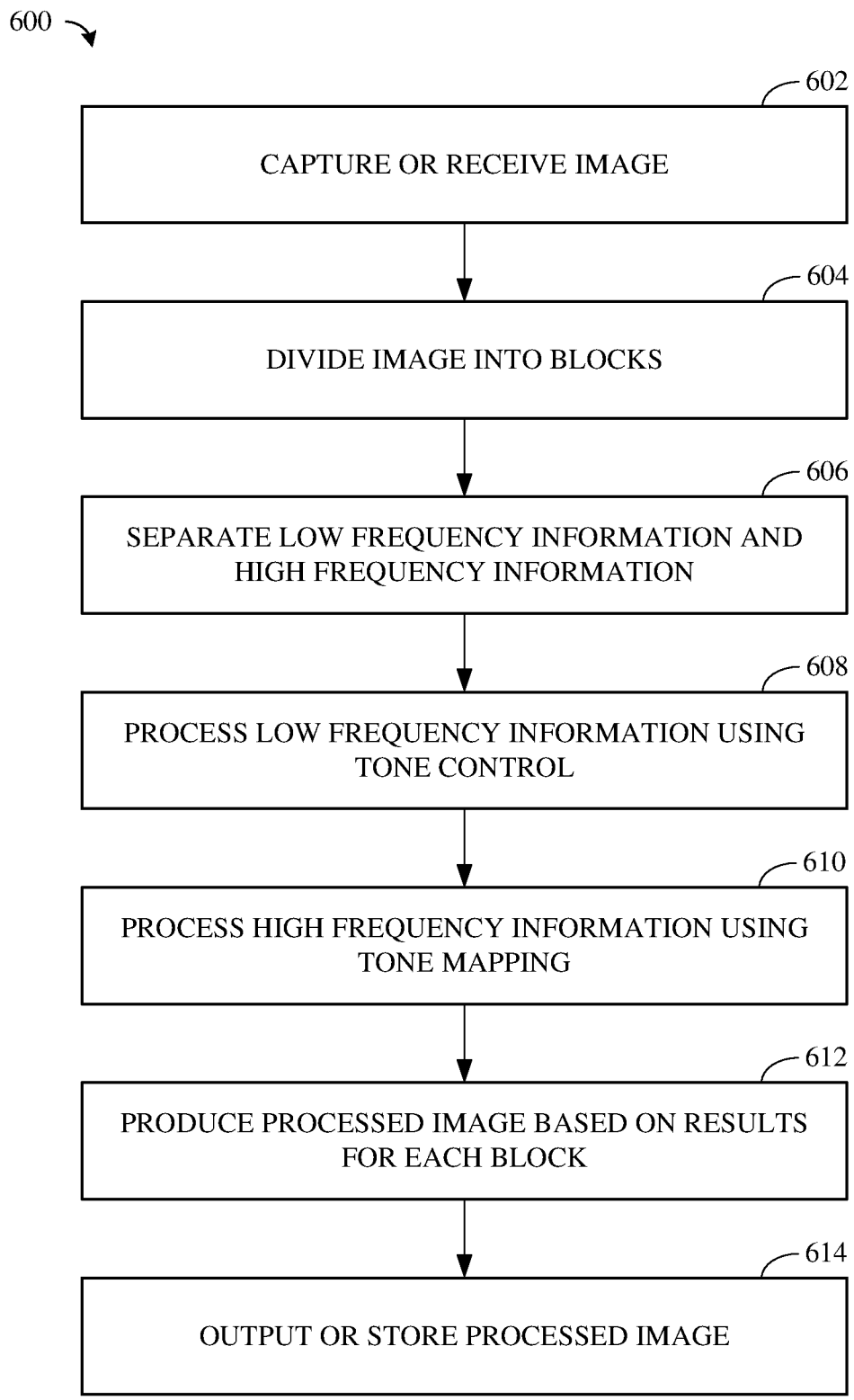
FIG. 6 is a flowchart showing an example of a technique for image processing using tone mapping and tone control integrations.

Further details of implementations and examples of techniques performed using the systems and pipelines described with respect to FIGS. 1A-5 are now described. FIG. 6 is a flowchart showing an example of a technique 600 for image processing using tone mapping and tone control integrations. The technique 600 can be performed, for example, using hardware and/or software components of an image capture system, such as the image capture device 100 shown in FIGS. 1A-D or the image capture device 200 shown in FIG. 2. For example, the image capture device 100 or the image capture device 200 may include one or more software components that process an image captured using an image capture device of the image capture device 100 or the image capture device 200, for example, using multi-level LUTs for control point processing, such as described in the pipeline 400 shown in FIG. 4.

In another example, the technique 600 can be performed using an integrated circuit. The integrated circuit may, for example, be a field programmable gate array (e.g., FPGA), programmable logic device (PLD), reconfigurable computer fabric (RCF), system on a chip (SoC), ASIC, and/or another type of integrated circuit. An image processor of the integrated circuit may, for example, include an image capture unit and/or an image and control parameter processing unit (e.g., either, a processor having one or multiple cores) configured to execute instructions to perform some or all of the technique 600.

Although the technique 600 is described with respect to a series of operations, the operations comprising the technique 600 may be performed in orders other than those described herein. In some implementations, the technique 600 may include additional, fewer, or different operations than those described herein.

At 602, an image is captured or received. For example, the image may be captured using an image sensor of an image capture unit of an image capture device. In another example, the image may be received from an image capture device or from a storage. At 604, the image is divided into blocks. For example, the image can be divided into 48 or more blocks.

At 606, low frequency information and high frequency information within each of the blocks are separated. At 608, the low frequency information for each block is processed using a tone control technique, such as MTC. Processing the low frequency information includes computing a gain curve for each block and performing a bilinear interpolation between adjacent blocks. The gain curve may, for example, be a GTM curve computed for the block (e.g., as opposed to the image as a whole). Performing the MTC can thus include using the gain curve to enhance a contrast of the low frequency information within one or more pixels of a given block. Performing a bilinear interpolation between a given block and one or more blocks adjacent to the given block within the image enables each block to be processed based on other blocks in the image. Thus, a current pixel within a given block is processed based on parameters associated with the given block and based on parameters associated with the one or more blocks adjacent to the given block within the image.

At 610, the high frequency information for each block is processed using a tone mapping technique, such as LTM. For example, processing the high frequency information can include using an edge preservation filter to preserve high frequency information within each block. Performing the LTM can thus include using the filter to preserve a contrast of the low frequency information within one or more pixels of a given block. In some implementations, processing the high frequency information can include performing LTM to preserve or enhance high frequency information of a given block and medium frequency information of the given block. For example, tuning a weighting value (e.g., a in the equation described above), one can choose whether to preserve or enhance the contrast. Furthermore, performing MTC and LTM in combination can include increasing a resolution of the MTC based on a size of the edge preservation filter used by the LTM. Increasing the resolution of the MTC in this way compensates for an effect on medium frequency information of the image by the LTM.

At 612, a processed image is produced based on the results of the image processing using MTC and LTM at each block. For example, the results of the image processing using MTC and LTM at a given block can represent processed pixels for the block. Those processed pixels can be combined into the processed image, such as based on the two-dimensional locations of the corresponding original pixels within the original image. Alternatively, producing the processed image using the processed pixels can include modifying the original image by replacing individual ones of the original pixels within the original image with corresponding ones of the processed pixels. At 614, the processed image is output or stored.

Where certain elements of these implementations may be partially or fully implemented using known components, those portions of such known components that are necessary for an understanding of this disclosure have been described, and detailed descriptions of other portions of such known components have been omitted so as not to obscure this disclosure.

In the present specification, an implementation showing a singular component should not be considered limiting; rather, this disclosure is intended to encompass other implementations including a plurality of the same component, and vice-versa, unless explicitly stated otherwise herein. Further, this disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared, or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smartphones, personal integrated communication or entertainment devices, or another device capable of executing a set of instructions.

As used herein, the term "computer program" or "software" is meant to include any sequence of machine-cognizable steps which perform a function. Such program may be rendered in any programming language or environment including, for example, C/C++, C#, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include FPGAs, PLDs, RCFs, SoCs, ASICs, and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), DRAM, Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of DSPs, reduced instruction set computers (RISCs), general-purpose complex instruction set computing (CISC) processors, microprocessors, gate arrays (e.g., field programmable gate arrays (FPGAs)), PLDs, RCFs, array processors, secure microprocessors, ASICs, and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA) (e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, Cellular Digital Packet Data (CDPD), satellite systems, millimeter wave or microwave systems, acoustic, infrared (i.e., IrDA), and/or other wireless interfaces.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of this disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within this disclosure.

While the above-detailed description has shown, described, and pointed out novel features of this disclosure as applied to various implementations, it will be understood that various omissions, substitutions, and changes in the form and details of the devices or processes illustrated may be made by those skilled in the art without departing from this disclosure. The foregoing description is in no way meant to be limiting, but rather should be taken as illustrative of the general principles of the technology.

What is claimed is:

1. An image capture apparatus, comprising:
an image sensor;
a processor; and
a memory including instructions executable by the processor to:
capture an image using the image sensor;
divide the image into a plurality of blocks including a given block;
separate low frequency information of the given block and high frequency information of the given block;
perform multiple tone control against the low frequency information of the given block to produce processed low frequency information;
perform local tone mapping against the high frequency information of the given block using an edge preservation filter to produce processed high frequency information;
produce a processed image based on the processed low frequency information and based on the processed high frequency information, the processed image corresponding to the image captured using the image sensor; and
output the processed image for storage or display
wherein a resolution of the multiple tone control is increased based on a size of the edge preservation filter, and
wherein increasing the resolution of the multiple tone control compensates for an effect on medium frequency information of the image by the local tone mapping.

2. The image capture apparatus of claim 1, wherein the instructions to process the low frequency information of the given block using multiple tone control include instructions to:
perform multiple tone control against the low frequency information of the given block based on a gain curve computed for the given block and based on results of a bilinear interpolation performed between the given block and one or more blocks adjacent to the given block within the image.

3. The image capture apparatus of claim 2, wherein the gain curve is a global tone mapping curve.

4. The image capture apparatus of claim 1, wherein a contrast of the low frequency information within one or more pixels of the given block is enhanced by performing the multiple tone control against the low frequency information of the given block.

5. The image capture apparatus of claim 1, wherein the size of the edge preservation filter is smaller than a size of a filter used to perform the local tone mapping without also performing the multiple tone control.

6. The image capture apparatus of claim 1, wherein a contrast of the high frequency information within one or more pixels of the given block is preserved or enhanced by performing the local tone mapping against the high frequency information of the given block.

7. The image capture apparatus of claim 1, wherein the instructions to process the high frequency information of the given block using local tone mapping include instructions to:
process a pixel of the given block based on a low pass version of a luminance value of the pixel averaged with one or more neighbors of the pixel to produce a processed pixel.

8. The image capture apparatus of claim 1, wherein the processed image is produced using multi-level lookup tables, wherein a first lookup table of the multi-level lookup tables stores parameter values used to process the low frequency information, wherein one of a plurality of second lookup tables of the multi-level lookup tables stores parameter values used to process the high frequency information.

9. An image processor, comprising:
a first unit configured to capture an image;
a second unit configured to divide the image into blocks and perform image processing against each of the blocks, wherein, for a given block of the blocks, the second unit performs the image processing by:
separating low frequency information of the given block and high frequency information of the given block;
performing multiple tone control against the low frequency information of the given block based on a gain curve computed for the given block and based on results of a bilinear interpolation performed between the given block and one or more blocks adjacent to the given block within the image;
performing local tone mapping against the high frequency information of the given block using an edge preservation filter; and
producing a processed block based on results of the multiple tone control and results of the local tone mapping,
wherein a processed image is produced based on the processed block and based on other processed blocks produced by the second unit,
wherein a resolution of the multiple tone control is increased based on a size of the edge preservation filter, and
wherein increasing the resolution of the multiple tone control compensates for an effect on medium frequency information of the image by the local tone mapping.

10. The image processor of claim 9, wherein the gain curve is a global tone mapping curve.

11. The image processor of claim 9, wherein the size of the edge preservation filter is smaller than a size of a filter used to perform the local tone mapping without also performing the multiple tone control.

12. The image processor of claim 9, wherein performing the multiple tone control against the low frequency information of the given block includes enhancing a contrast of the low frequency information within one or more pixels of the given block.

13. The image processor of claim 9, wherein performing the local tone mapping against the high frequency information of the given block includes preserving or enhancing a contrast of the high frequency information within one or more pixels of the given block.

14. The image processor of claim 9, wherein the processed blocks are produced using multi-level lookup tables, wherein a first lookup table of the multi-level lookup tables stores parameter values associated with low frequency information of the image, wherein a plurality of second lookup tables of the multi-level lookup tables each stores parameter values associated with high frequency information of one of the blocks.

15. A method, comprising:
    filtering a block of an image to separate low frequency information of the block and high frequency information of the block;
    processing the low frequency information using multiple tone control and based on a global tone mapping curve;
    processing the high frequency information using local tone mapping and an edge preservation filter; and
    producing a processed image using the processed low frequency information and the processed high frequency information,
    wherein a resolution of the multiple tone control is increased based on a size of the edge preservation filter, and
    wherein increasing the resolution of the multiple tone control compensates for an effect on medium frequency information of the image by the local tone mapping.

16. The method of claim 15, wherein processing the low frequency information using the multiple tone control and based on the global tone mapping curve comprises enhancing a contrast of the low frequency information within one or more pixels of the block,
    wherein processing the high frequency information using local tone mapping comprises preserving or enhancing a contrast of the high frequency information within the one or more pixels of the block.

17. The method of claim 15, wherein the size of edge preservation filter is smaller than a size of a filter used to perform the local tone mapping without also performing the multiple tone control.

18. The method of claim 15, wherein processing the low frequency information using the multiple tone control and based on the global tone mapping curve comprises:
    performing multiple tone control against the low frequency information based on the global tone mapping curve and based on results of a bilinear interpolation performed based on one or more blocks adjacent to the block within the image.

19. The method of claim 15, wherein a contrast of the low frequency information within one or more pixels of the block is enhanced by performing the multiple tone control against the low frequency information.

20. The method of claim 15, wherein a contrast of the high frequency information within one or more pixels of the block is preserved or enhanced by performing the local tone mapping against the high frequency information.

* * * * *